United States Patent
Yun et al.

[11] Patent Number: 6,090,170
[45] Date of Patent: Jul. 18, 2000

[54] MULTIHYDROXYPOLYALKENYL-SUBSTITUTED AMINE COMPOUNDS AND FUEL COMPOSITION COMPRISING THE SAME

[75] Inventors: Hyun-ki Yun; Jung-jin Kim; Yong-hwa Yeom; Il-seung Kim; Myeong-seog Kim; Byung-keel Sohn, all of Daejeon-si; Kyu-shon Jung, Chungcheongnam-do, all of Rep. of Korea

[73] Assignee: Daelim Industrial Co., Ltd., Rep. of Korea

[21] Appl. No.: 09/223,914

[22] Filed: Dec. 31, 1998

[30] Foreign Application Priority Data

Dec. 31, 1997 [KR] Rep. of Korea .................. 1997-80261

[51] Int. Cl.$^7$ .................................. C01L 1/22; C01L 1/18
[52] U.S. Cl. ................................ 44/433; 44/425; 44/426; 44/429; 44/434; 564/330; 564/374; 564/382; 564/388; 564/506
[58] Field of Search ............................. 44/434, 433, 425, 44/426, 429; 525/379, 380, 381; 528/392, 423; 564/506, 382, 503, 388, 330, 374

[56] References Cited

U.S. PATENT DOCUMENTS

| | | | |
|---|---|---|---|
| 3,438,757 | 4/1969 | Honnen et al. | 44/412 |
| 3,574,576 | 4/1971 | Honner et al. | 44/412 |
| 3,794,586 | 2/1974 | Kimura et al. | 508/545 |
| 4,549,885 | 10/1985 | Knapp | 44/434 |
| 4,604,103 | 8/1986 | Campbell | 44/434 |
| 4,816,037 | 3/1989 | Horodysky et al. | 44/434 |
| 4,832,702 | 5/1989 | Kummer et al. | 44/434 |
| 4,859,210 | 8/1989 | Franz et al. | 44/434 |
| 5,746,786 | 5/1998 | Mueller et al. | 44/434 |
| 5,851,377 | 12/1998 | Bush | 208/48 AA |

FOREIGN PATENT DOCUMENTS

0476485-B1 4/1994 European Pat. Off..

*Primary Examiner*—Margaret Medley
*Attorney, Agent, or Firm*—Blakely Sokoloff Taylor & Zafman

[57] ABSTRACT

The present invention relates to derivatives of polyalkenyl amine substituted with numerous hydroxy groups of the following formula (I) useful as a novel fuel detergent.

(I)

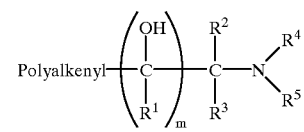

wherein polyalkenyl denotes a branched alkyl derived from polyolefin which has a molecular weight of 400~5,000 and is prepared with olefin having 2 to 6 carbon atoms; m is an integer ranging from 2 to 10, $R^1$, $R^2$ and $R^3$ may be identical or different, and represent a hydrogen atom or a linear or branched alkyl having 1 to 4 carbon atoms: $R^4$ and $R^5$ may be identical or different, and denote a hydrogen atom, a $C_1$–$C_{10}$ alkyl group, a hydroxyalkyl, a phenyl, naphthyl, an aminoalkyl of formula (II) or a polyaminoalkylene of formula (III)

(II)

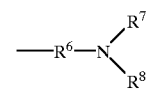

(III)

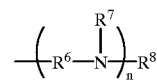

wherein $R^6$ denotes a $C_2$–$C_{10}$ alkylene group: $R^7$ and $R^8$ may be identical or different, and denote a hydrogen atom, a $C_1$–$C_{10}$ alkyl group, a phenyl, a naphthyl or a $C_1$–$C_{10}$ hydroxyalkyl group, and n is an integer ranging from 2 to 8.

12 Claims, No Drawings

MULTIHYDROXYPOLYALKENYL-SUBSTITUTED AMINE COMPOUNDS AND FUEL COMPOSITION COMPRISING THE SAME

TECHNICAL FIELD

The present invention relates to derivatives of multihydroxypolyalkenyl substituted amine of the following formula (I) useful as a novel fuel detergent. More particularly, the present invention relates to multihydroxypolyalkenyl substituted amine compounds of the following formula (I) useful as a novel fuel detergent, which can efficiently inhibit the formation of deposits in the injectors of the gasoline engines and diesel engines and also in the carburetor and intake valve of the gasoline engines by incorporating the active detergent into the fuel, and a process for preparing the same and a fuel composition comprising the same.

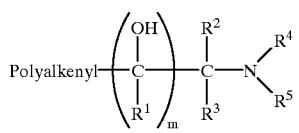

(I)

wherein polyalkenyl denotes a branched alkyl derived from polyolefin which has a molecular weight of 400~5,000 and is prepared with olefin having 2 to 6 carbon atoms, preferably 3 to 4 carbon atoms, more preferably isobutene; m is an integer ranging from 2 to 10, preferably from 2 to 3, more preferably is 2: $R^1$, $R^2$ and $R^3$ may be identical or different, and represent a hydrogen atom or a linear or branched alkyl having 1 to 4 carbon atoms: $R^4$ and $R^5$ may be identical or different, and denote a hydrogen atom, a $C_1$–$C_{10}$ alkyl group, a hydroxyalkyl, a phenyl, naphthyl, an aminoalkyl of formula (II) or a polyaminoalkylene of formula (III)

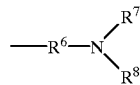

(II)

wherein $R^6$ denotes a $C_2$–$C_{10}$ alkylene group: $R^7$ and $R^8$ may be identical or different, and denote a hydrogen atom, a $C_1$–$C_{10}$ alkyl group, a phenyl, a naphthyl or a $C_1$–$C_{10}$ hydroxyalkyl group,

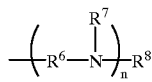

(III)

wherein n is an integer ranging from 2 to 8, $R^6$, $R^7$ and $R^8$ are the same as defined above. As a preferred embodiment, $R^4$ is a hydrogen atom or an aminomethyl group and $R^5$ is an aminoethyl, a hydroxyethyl or an aminoethyleneaminoethyl group. More preferably, both $R^4$ and $R^5$ are aminoethyl group, or $R^4$ is a hydrogen atom and $R^5$ is an aminoethyleneaminoethyl group.

BACKGROUND OF THE INVENTION

It has been known that deposits are formed on the surface of fuel injectors of gasoline engines and diesel engines and on the surface of carburetors and intake valves of the gasoline engines by the oxidation of the fuel and lubricant oil.

These deposits even in a relatively small amount can cause severe drive-ability problems such as misfire and poor acceleration. Moreover, the engine deposits can significantly increases an automobile's fuel consumption and production of exhaust pollutants.

Under these circumstances, aliphatic amine compounds based on a long chained hydrocarbon have been developed and used as a detergent for the fuel to prevent or inhibit the formation of such deposits. U.S. Pat. No. 3,438,757 and U.S. Pat. No. 3,574,576 disclose that hydrocarbyl amine having a molecular weight of 425~10,000, preferably 450~5,000 is useful as a detergent for the fuel of internal combustion engine or as a dispersant for the lubricant oil.

However, chlorine compounds which are employed in the process for the preparation of the hydrocarbyl amine are remained in the detergent. When such a detergent is used in addition to the fuel, the corrosion of the engine and the exhaustion of hazardous gas increase.

European Patent No. 476485 A discloses that polybutylaminoalcohol produced by reacting amine with polybutene epoxide obtained by the epoxidation of polybutene is useful as a detergent for the gasoline and as a additive to the lubricant oil. The polybutylaminoalcohol is produced by a nucleophilic substitution reaction of polybutene epoxide with amine.

However, since the molecular weight of polybutene is too large and the double bond linkages thereof have too many substitutions of alkyl, the polybutene epoxide produced therefrom exhibits a low reaction rate by the steric hindrance so that the polybutene epoxide would be subjected to the reaction with amine for a long period of time to produce polybutylene aminoalcohol. Thus, the effect to prevent the formation of deposits on the intake valve of the gasoline engine would have a little actual effect.

OBJECT OF THE INVENTION

The inventor of the present invention had conducted a considerable amount of research to solve the above mentioned problems by introducing numerous hydroxyl groups to the polyolefin chain and without using halogen.

An object of the invention is to provide multihydroxypolyalkenyl substituted amine compound useful as a novel detergent for the fuel which have an excellent effect to inhibit the formation of deposits in the carburetor and intake valves of the gasoline engines and in the fuel injector nozzle of the gasoline engines and diesel engines without causing the engine corrosion.

Another object of the invention is to provide a fuel concentrate which may be added to a fuel for providing composition containing the multihydroxypolyalkenyl substituted amine compounds.

A further object of the invention is to provide a fuel composition comprising the multihydroxypolyalkenyl substituted amine compound or the fuel concentrate described above.

Still a further object of the invention is to provide a process for preparing the multihydroxypolyalkenyl substituted amine compounds.

DISCLOSURE OF THE INVENTION

Accordingly, the present invention relates to multihydroxypolyalkenyl substituted amine compounds of formula (I) useful as a novel detergent for the fuel and a process for preparing the same.

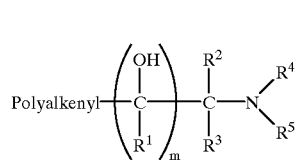
(I)

wherein polyalkenyl denotes a branched alkyl derived from polyolefin which has a molecular weight of 400~5,000 and is prepared with olefin having 2 to 6 carbon atoms, preferably 3 to 4 carbon atoms, more preferably isobutene: m is an integer ranging from 2 to 10, preferably from 2 to 3, more preferably is 2: $R^1$, $R^2$ and $R^3$ may be identical or different and represent a hydrogen atom or a linear or branched alkyl having 1 to 4 carbon atoms: $R^4$ and $R^5$ may be identical or different, and denote a hydrogen atom, a $C_1-C_{10}$ alkyl, a hydroxyalkyl, a phenyl, a naphthyl, an aminoalkyl of formula (II) or a polyaminoalkylene of formula (III).

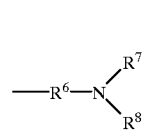
(II)

wherein $R^6$ denotes a $C_2-C_{10}$ alkylene, $R^7$ and $R^8$ may be identical or different, and denote a hydrogen atom, a $C_1-C_{10}$ alkyl, a phenyl, a naphthyl or a $C_1-C_{10}$ hydroxyalkyl,

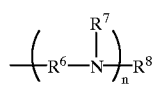
(III)

wherein n is an integer ranging from 2 to 8, and $R^6$, $R^7$ and $R^8$ are the same as defined above.

In the above substitutions, preferably $R^4$ is a hydrogen atom or aminoethyl and $R^5$ is an aminoethyl, a hydroxyethyl or an aminoethyleneaminoethyl, more preferably, $R^4$ and $R^5$ are both aminoethyl groups or $R^4$ is an hydrogen atom and $R^5$ is an aminoethyleneaminoethyl.

The multihydroxypolyalkenyl substituted amine compounds can be produced by reacting a hydroxypolyolefin epoxide of formula (IV) with an amine of formula (V)

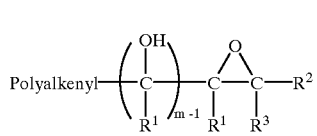
(IV)

wherein polyalkenyl denotes a branched alkyl derived from polyolefin which has a molecular weight of 400~5,000 and is prepared with olefin having 2 to 6 carbon atoms, preferably 3 to 4 carbon atoms, more preferably isobutene: m is an integer ranging from 2 to 10, preferably from 2 to 3, more preferably is 2: $R^1$, $R^2$ and $R^3$ may be identical or different, and represent a hydrogen atom or a linear or branched alkyl having 1 to 4 carbon atoms.

(V)

wherein $R^4$ and $R^5$ may be identical or different, and denote a hydrogen atom, a $C_1-C_{10}$ alkyl, a hydroxyalkyl, a phenyl, a naphthyl, an aminoalkyl of formula (II) or a polyaminoalkylene of formula (III)

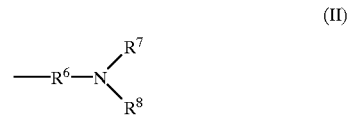
(II)

wherein $R^6$ denotes a $C_2-C_{10}$ alkylene, $R^7$ and $R^8$ may be identical or different, and denote a hydrogen atom, a $C-C_{10}$ alkyl, a phenyl, a naphthyl or a $C_1-C_{10}$ hydroxyalkyl,

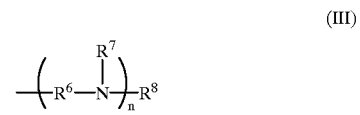
(III)

wherein n is an integer ranging from 2 to 8, and $R^6$, $R^7$ and $R^8$ are the same as defined above.

Said hydroxypolyolefin epoxide is produced from polyolefin containing various isomers and thus can also exist as various kind of isomers. The multihydroxypolyalkenyl substituted amine compounds accordingly can also exist as various isomers.

The present invention is explained in detail below.

1. Hydroxypolyolefin Epoxide

The hydroxypolyolefin epoxide used in the preparation of the Multihydroxypolyalkenyl substituted amine compounds which are useful as fuel detergent is produced by the following reactions in three stages:

The first stage is epoxidation reaction of polyolefin to prepare polyolefin epoxide.

The polyolefin epoxide is obtained by epoxidizing a polyolefin with an epoxidizing agent. In the epoxidation reaction, an oxirane ring is produced from epoxidation of the double bond in the polyolefin. The polyolefin starting material used in the preparation of the polyolefin epoxide is a high molecular weight of about 400 to 5,000, and preferably about 500 to 2,500. Such high molecular weight polyolefins are generally mixtures of molecules having different molecular weights and can have at least one branch per 6 carbon atoms along the chain, preferably at least one branch per 4 carbon atoms along the chain, and most preferably at least one branch per 2 carbon atoms along the chain.

Such polyolefin can be produced from olefin having 2~6 carbon atoms, preferably 3~4 carbon atoms, and the most preferable polyolefin is a polybutene produced from isobutylene or C4 fraction containing isobutylene, This polyolefin has double bounds in its molecules, and the double bond is epoxidized by an oxidant to produce the oxirane ring.

Oxidants applicable to the preparation of the polyolefin epoxide have been known in public. Adequate oxidants are hydrogen peroxide, peracetic acid, perbenzoic acid, performic acid, permonophthalic acid, percamphoric acid, persuccinic acid and pertrifluoroacetic acid, preferably hydrogen peroxide.

Where hydrogen peroxide is employed, it is desirable to add an organic acid such as formic acid or acetic acid. Particularly, in case of using an organic acid having at least 2 carbon atoms such as acetic acid, it is desirable to add an inorganic acid such as sulfuric acid or phosphoric acid. In this case, the molar ratio of olefin to hydrogen peroxide to be added is 1:0.2 to 1:2.0. preferably 1:0.4 to 1:1.5 and the molar ratio of olefin to the organic acid to be added is 1:0.2 to 1:1.5, preferably 1:0.5 to 1:1.

On the other hand, when organic acids including acetic acid having at least 2 carbon atoms are used, the molar ratio of olefin to the inorganic acid to be added is from 1:0.1 to 1:0.6, preferably from 1:0.2 to 1:0.4.

The reaction is desirably carried out at 20~90° C. The resulted products are washed with water to remove the oxidant and organic acid and then are distilled in a vacuum to remove the solvent or are directly distilled in a vacuum without being washed, to obtain polyolefin epoxide.

The second stage is an isomerization reaction of the polyolefin epoxide. The polyolefin epoxide produced from the first reaction has an oxirane ring which is opened by a strong base to form a double bond and to provide a hydroxy polyolefin. Such ring opening reaction has been reported in the literatures. (Ex: Encyclopedia of chemical technology, 3rd ed, vol 18, p 633).

In this reaction; common bases publicly known can be used. Preferably, an alkali metal hydroxide or an alkali metal alkoxide obtained by the reaction of an alcohol and an alkali metal can be used. More preferably, sodium alkoxide, potassium alkoxide, sodium hydroxide or potassium hydroxide can be used. The molar ratio of the base to the polyolefin epoxide used in the reaction is 0.002 to 0.5 preferably 0.005 to 0.2.

The reaction is carried out in 100~300° C., preferably 170 to 250° C. Metals in the resulted products are removed in a manner of washing or adsorbing to ion exchange resins, etc. Excess amount of alcoholic component is distilled off at reduced pressure to provide hydroxypolyolefin.

When the first and second reactions are repeated, multihydroxypolyolefin with at least 2 hydroxy group is formed, which, after being subjected to the reaction of epoxidizing in the following third reaction, forms multihydroxypolyolefin epoxide with at least 2 hydroxy groups. (Hereinafter polyolefin epoxide with at least one hydroxy group is referred to as hydroxypolyolefin epoxide).

The third reaction is to produce hydroxypolyolefin epoxides by epoxidizing the double bond of the hydroxypolyolefin produced in the second reaction in the same way as in the first reaction.

2. Amine Component

The amine component is reacted with the hydroxypolyolefin epoxides to produce the multihydroxypolyalkenyl substituted amine compounds which can be used as a fuel detergent of the present invention. The amine compounds which can be used to produce the multihydroxypolyalkenyl substituted amine have the general formula (V) and have at least one basic nitrogen atom with at least one hydrogen atom. The compounds having at least one basic nitrogen atom with at least one hydrogen atom can be selected from ammonia, ethylenediamine, diethylenetriamine, triethylenetetraamine, di(trimethylene)triamine, dipropylenetriamine, tetraethylenepentaamine, 1,2-propylenediamine, 1,3-propylenediamine, dimethylaminopropylendiamine, dipropylenetriamine, 2-aminoethanol, 2-(2-aminoethylamino)ethanol, 3-amino-1-propanol, 4-aminophenol, N-methylamine, N-ethylamine, N-n-propylamine, N-isopropylamine, N-n-butylamine, N-isobutylamine, N-sec-butylamine, N-tert-butylamine. N-n-pentylamine, N-cyclopentylamine, N,n-hexylamine, N-cyclohexylamine, N,N-dimethylamine, N,N-diethylamine, N,N-di-n-propylamine, N-N-diisopropylamine, N,N-di-n-butylamine, N,N-diisobutylamine, N,N-di(2-hydroxyethyl)amine, N,N-di(3-hydroxypropyl)amine, N,N-di(ethoxyethyl)amine and N,N-di(propoxyethyl)amine: Most preferably, ethylenediamine, diethylenetriamine and 2-aminoethanol can be used.

3. Preparation of Multihydroxypolyalkenyl-Substituted Amine Compounds

As set forth hereinabove, multihydroxypolyalkenyl-substituted amine compounds for a fuel detergent of the present invention are produced by reacting a hydroxypolyolefin epoxide of said formula (IV) derived from a branched polyolefin having a molecular weight of 400~5,000 with an amine of said formula (V). Multihydroxypolyalkenyl-substituted amine compound is produced by a ring-opening reaction of the oxirane ring in the hydroxypolyolefin epoxide through a nucleophilic substitution reaction with amine.

The reaction of the hydroxypolyolefin epoxide and the amine is carried out generally at 100~280° C., preferably at 140~250° C. with or without a solvent. The pressure of the reaction is variable generally according to the temperature of the reaction, the presence or absence of the solvent and the boiling point of the amine component. The reaction is generally carried out in the absence of oxygen and with or without a catalyst.

It is desirable that the molar ratio of the hydroxypolyolefin epoxide to amine is from 1:1 to 1:10 and that a large quantity of amine is employed to suppress desirably substituting a great deal of multihydroxypolyalkenyl groups for protons of an amine. The reaction of the hydroxypolyolefin epoxide and the amine can be carried out in the presence or absence of a catalyst. As a suitable catalyst, a Lewis acid such as trichloroaluminium, trifluoroboron, tetrachlorotitanium or ferric chloride or a solid catalyst containing a moiety of Lewis acid and Bronsted acid such as silica, silica alumina and also an organic acid and water can be used.

The reaction can also be carried out with or without a reaction solvent. The solvent is generally used when it is necessary to reduce the viscosity of the reaction product. The solvent if used should be stable and inactive to the reactants and the product. Adequate solvents are an aliphatic and aromatic hydrocarbon or an aliphatic alcohol. The reaction time depends on the reaction temperature, a kind of hydroxypolyolefin epoxide and amine, and presence or absence of catalyst.

The reaction can be carried out for 1 to 30 hours, preferably 2 to 20 hours. When the reaction is completed, the reaction mixture is extracted with a solvent of hydrocarbon-water or hydrocarbon-alcohol-water to remove the residual amine salt or amine un-reacted. The solvent is then distilled and removed under reduced pressure to separate possibly the product. Alternatively, the reaction mixture can be directly distilled off under reduced pressure to remove the residual amine and solvent.

In most case, the compounds of the present invention which can be used as fuel detergents are not pure unified compounds but a mixture of compounds having an average molecular weight and many isomer.

Besides the multihydroxypolyalkenyl-substituted amine compounds, the reaction products may contain many by-products derived from polyolefin. However, these by-products can be used as a composition of fuel detergent of present invention without being separated out.

4. The Fuel Concentrate Comprising the Detergent

The fuel detergent of the present invention is generally used in a hydrocarbon fuel to inhibit the formation of deposit in the engine, particularly to inhibit the formation of deposit in the fuel injectors of gasoline engine and diesel engine, and the intake valve of the gasoline engine. Particularly, it is desirable that the fuel detergent of the present invention is generally used in a hydrocarbon fuel boiling in a gasoline or diesel range.

The proper concentration of detergent necessary in order to achieve the desired detergency varies depending upon the type of fuel employed, the presence of other detergents, and other additives, etc. Generally, however, from 50 to 5,000 weight ppm, preferably from 100 to 2,500 ppm of multihydroxypolyalkenyl-substituted amine per part of base fuel is needed to achieve the best results. The detergent may be formulated as a concentrate, using an inert stable oleophillic organic solvent boiling in the range about 65° C. to 205° C. Preferably, an aliphatic or aromatic hydrocarbon solvent is used, such as benzene, toluene, xylene or higher-boiling aromatics or aromatic thinners.

The detergent in the concentrate is 10~70% by weight, preferably 30~60% by weight.

The fuel detergent of the present invention can be used in the fuel together with other kind of usual additives. An octane number improver such as MTBE, an antioxidant, an antinock agent, a demulsifier and the like can be together used in the gasoline fuel and a pour point depressant, a flow improver, a cetane number improver and other additives known in public can be together used in the diesel fuel.

The fuel detergent of the present invention can be employed with a fuel-soluble non-volatile carrier oil. Such a carrier oil can be selected from a poly(oxyallkylene) derivative, a mineral oil, polyalkylene and the like. The carrier oil is considered as to support the inhibition of the formation of deposits when used together with a detergent for the fuel, and can provide a synergistic effect to inhibit the formation of deposits when used together with the fuel detergent of the present invention. The carrier oil is added generally in the amount of 100~5,000 ppm by weight, preferably 200~2,000 ppm by weight relative to the hydrocarbon fuel. The liquid carrier oil can be used additively with the fuel concentrate comprising the detergent in the amount of 20~60% by weight, preferably 30~50% by weight.

EFFECT OF THE INVENTION

When the detergent of the present invention is added to the diesel fuel in the amount of 300 ppm by weight, the air flow rate of the injector nozzle is increased to 22.4% as compared with the fuel which does not contain the detergent, and is also increased to 6% in comparison with the fuel which contains commercial detergents. Accordingly, the detergent of the present invention is distinctly efficient to be used as a detergent for the injector of the diesel engine.

Further, the detergent of the present invention has an excellent effect to suppress the formation of deposits on the intake valve. Thus it is confirmed that the detergent of the present invention has an excellent detergency when it is introduced to the diesel fuel as well as to the gasoline fuel.

BEST MODE FOR CARRYING OUT THE INVENTION

The present invention will be understood more readily with reference to the following examples and comparative examples, however, these examples are intended to illustrate the invention only and are not to be construed to limit the scope of the invention.

EXAMPLE 1

Preparation of polybutene epoxide 200 g of DAELIM polybutene 0900 (Molecular weight 920), 100 g of xylene and 10.2 g of formic acid were introduced into a 500 ml flask equipped with a condenser and agitated. While the temperature in the flask was kept at 50° C., 15 g of 60% $H_2O_2$ was added through an injection pump for one hour, and the reactants were reacted for 4 hours. When epoxidation was completed, the aqueous layer in the reaction mixture was separated through a 1,000 ml separating funnel. The solvent of the organic layer was distilled off under reduced pressure to obtain 195 g of slightly yellowish polybutene epoxide.

The formation of epoxide was confirmed by NMR detection. The yield of the polybutene epoxide was 96% by weight. When the resultant product was subjected to a column chromatography on silica gel, the un-reacted polybutene was eluted by n-hexane. The yield of the polybutene epoxide can be determined by measuring the weight of the eluted portion after distilling off the n-hexane.

EXAMPLE 2

Preparation of polybutene epoxide

Polybutene epoxide prepared in the same manner as in Example 1 except that 3.8 g of 60% $H_2O_2$ was used and was reacted for 2 hours. The yield is of the polybutene epoxide was 30% by weight.

EXAMPLE 3

Preparation of hydroxy polybutene 130 g of the polybutene epoxide prepared in Example 1 and 40 g of 2 wt % isopropanolic KOH solution were introduced into a high pressured reactor to be reacted under nitrogen atmosphere at 200° C. for 3 hours. When the reaction was completed, the reaction mixture was introduced into a 500 ml separating funnel and then 200 ml of petroleum ether was added to the funnel. The mixture was washed with 200 ml of water twice to remove potassium.

The reaction mixture completely washed was distilled to remove alcohol and the solvent under reduced pressure to obtain 128 g of yellow hydroxy polybutene. The formation of the hydroxypolybutene was recognized through the detection of double bond by NMR and hydroxy group by FT-IR. The hydroxyl value in the resultant product was 39.

EXAMPLE 4

Preparation of hydroxy polybutene 130 g of the polybutene epoxide prepared in Example 2 and the potassium t-butoxide solution prepared by dissolving 0.179 g of potassium in 35 g of t-butanol were reacted as in Example 3. The hydroxyl value of the reaction product was 19.

EXAMPLE 5

Preparation of hydroxypolybutene epoxide 100 g of hydroxypolybutene prepared in Example 3, 50 g of xylene, 5 g of formic acid and 9 g of 60% $H_2O_2$ were reacted in the same manner as in Example 1 to obtain hydroxy polybutene epoxide. The formation of hydroxypolybutene epoxide could be confirmed by NMR analysis. The yield of epoxide was approximately 94%.

EXAMPLE 6

Preparation of hydroxypolybutene epoxide

Hydroxy polybutene prepared in Example 4 was subjected to a reaction as in Example 5 to obtain hydroxy polybutene epoxide. The yield of epoxide was approximately 96%.

EXAMPLE 7

Preparation of dihydroxypolybutenyl amine 80 g of the hydroxypolybutene epoxide prepared in Example 5, 30 g of diethylenetriamine and 3 g of water were introduced into a high pressure reactor and were reacted under nitrogen atmosphere at 230° C. for 4 hours. After the reaction was completed, the reaction mixture was cooled to room temperature and separated with 500 ml separating funnel to remove the amine layer. The reaction mixture from which amine layer was removed was diluted with 200 ml n-hexane. The solution was washed twice with 200 ml of water to remove the residual amine un-reacted.

The resultant which contains water and n-hexane was distilled under reduced pressure to remove the remaining water and n-hexane and to obtain dihydroxypolybutenyl amine. The amount of polybutene-derived amine compounds in the resultant product were determined by column chromatography on silica gel. Elution with n-hexane/diethylether (1:1, v/v) gave the un-reacted polybutene and derivatives thereof which were not combined to the amine. The amount of the polybutene-derived amine compounds can be determined by measuring the weight of the residual portion after distilling off the n-hexane and diethylether.

The amount of the polybutene-derived amine compound was 50% by weight, and the amount of basic nitrogen is 1.78% by weight and the hydroxyl value was 61. On the other hand, the hydroxyl value of un-reacted polybutene and derivatives thereof which were not combined to the amine was 23 and the amount of dihydroxypolybutenyl amine in the reaction mixture was 40% by weight.

EXAMPLE 8

Preparation of dihydroxypolybutenyl amine

Dihydroxypolybutenyl amine compound was prepared in the same manner as in Example 7 except that hydroxy polybutene epoxide prepared in Example 6 was reacted for 9 hours. The amount of polybutene-derived amine compound in the resultant product was 48% by weight and the amount of the basic nitrogen was 1.71% by weight and the hydroxyl value was 59.

On the other hand, the hydroxyl value of the un-reacted polybutene and derivatives thereof which were not combined with amine was 30 and the amount of dihydroxypolybutenyl amine in the resultant product was 28% by weight.

EXAMPLE 9

Preparation of dihydroxypolybutenyl amine

Dihydroxypolybutenyl amine compound was prepared in the same manner as in Example 7 except that 70 g of ethylene diamine was used as the amine and that the hydroxy polybutene epoxide prepared in Example 6 was used.

The amount of polybutene-derived amine compound was 43% by weight, basic nitrogen 1.10% by weight and the hydroxyl value 57. On the other hand, the hydroxyl value of the un-reacted polybutene and derivatives thereof which were not combined with amine was 27 and the amount of dihydroxypolybutenyl amine in the resultant product was 32% by weight.

EXAMPLE 10

Preparation of dihydroxypolybutenyl amine

Dihydroxypolybutenyl amine compound was prepared in the same manner as in Example 7 except that 60 g of 2-aminoethanol was used as the amine and that the hydroxy polybutene epoxide prepared in Example 6 was used. The amount of polybutene-derived amine in the resultant product was 40% by weight and basic nitrogen 0.54% by weight.

Comparative Example 1

Preparation of hydroxypolybutenyl amine

Hydroxypolybutenyl amine was prepared in the same manner as in Example 7 except that polybutene epoxide prepared in Example 1 was reacted for 6 hours. The amount of polybutene-derived amine compound in the resultant product was 34% by weight and basic nitrogen 1.25% by weight. The polybutene-derived amine produced was hydroxy polybutenyl amine.

Comparative Example 2

Preparation of hydroxypolybutenyl amine

Hydroxypolybutenyl amine was prepared in the same manner as in Example 7 except that polybutene epoxide prepared in Example 1 was reacted for 20 hours. The amount of polybutene-derived amine compound in the resultant product was 42% weight and basic nitrogen 1.51% by weight. Polybutene-derived amine produced was hydroxypolybutenyl amine.

Test 1

Injector Nozzle Cocking Test of the Diesel Engine

An Injector nozzle cocking test of the diesel engine conducted. The diesel fuel having a boiling point of 151~375° C. was used. The test engine used was a Hyun-Dai gallopen engine with a pintle type nozzle. Prior to the test, the air flow rate of a new nozzle was measured at pintle lift 0.1 mm by the method of ISO 4010. The engine equipped with assembled nozzles was operated with the fuel containing or not containing a detergent for 6 hours under the conditions of operation in the following table. After 6 hours of operation the nozzles were taken apart and the air flow rate was measured by said method.

The cleansing effect of the detergent to the injector nozzle was appreciated through comparing the air flow of the nozzles before or after the 6 hours of operating the engine respectively.

| Engine | Hyun-Dai Galloper |
|---|---|
| Load of Engine | 58 Nm |
| Number of Cylinder | 4 |
| Speed of the Engine | 3000 rpm |
| Operation Hour | 6 hours |
| Temperature of Cooling water at the outlet | 94 ± 2° C. |
| Temperature of the fuel at the inlet | 30 ± 2° C. |

The air flow rate after and before the operation is shown in Table 1. The detergent of the present invention was prepared by mixing dihydroxypolybutenyl amine compounds in Example 7 and xylene to the solution of 50% by weight to produce the fuel concentrate, which was added to the diesel fuel in the amount of 300 ppm by weight to be tested. The results presented in Table 1 is a mean value of the air flow rate measured at each of the four nozzles.

TABLE 1

| Additive | Air flow rate of new nozzle before operation ($cm^2$/min) | Air flow rate of nozzle after the operation ($cm^2$/min) | Residual air flow rate after the operation(%) |
|---|---|---|---|
| Fuel without Additive | 127.8 | 52.5 | 41.1 |
| With the Concentrate of Example 7 (300 ppm by wt.) | 127.5 | 81.0 | 63.5 |
| With Commercial Additive (350 ppm by wt.) | 127.5 | 73.3 | 57.5 |

When the detergent of the present invention was added to the diesel fuel in the amount of 300 ppm by weight, 22.4% of the air flow rate was increased in comparison with the fuel containing no additive. Further, a 6% increase in the air flow was observed in compared with the commercial additive. Accordingly, the detergent of the present invention proves to have an excellent effect as a detergent for the injector of the diesel engine.

Test 2

Intake Valve Deposit Test of the Gasoline Engine

The intake valve deposit test of the gasoline engine was conducted with the gasoline fuel comprising 400 ppm by weight of a commercial detergent or each of the fuel concentrate prepared in the same manner as in Test 1 from the dihydroxypolybutenyl amine compound prepared in Example 7 and the hydroxypolybutenyl amine compound prepared in comparative Example 2, respectively. The base gasoline used in the above test is a unleaded gasoline containing no fuel detergent.

The test was carried out in an simulator made by Toyota Company in Japan for the intake valve deposit test. The simulator is designed so that the temperature of the valve is controlled by an electric heater and flow rate of the oil ejected through the valve guide to the surface of the valve is also controlled. Thus, the simulator is known as adequate equipment for the intake valve deposit test. (SAE Technical paper series 900152, "Mechanism of intake valve deposit formation part II: Simulation test", SAE Technical paper series 900065, "Mechanism of intake valve deposit formation part (III): Effect of gasoline quality").

The test was conducted for 10 hours, at the end of which time the intake valve is removed, washed with n-heptane and weighed. The previously determined weight of the clean valve is subtracted from the weight of the valve at the end of the run. The difference between the two weights is the weight of the deposit formed for the test. The operating conditions of the test are as follows.

The amount of deposit formed on the intake valve in shown in Table 2. The test was conducted for 10 hours under the conditions below.

TABLE 2

| Test hour | 10 hours |
|---|---|
| Injection rate of the fuel | 100 ml/hour |
| Flow rate of the oil | 0.035 ~ 0.045 ml/hour |
| Valve speed | 500 rpm |
| Test cycle(Temperature of valve) | 160° C.(0.5 hour) → 250° C.(0.5 hour) |

| Additive (400 ppm by wt.) | Deposits on the intake valve(mg/valve) |
|---|---|
| Fuel without additive | 3.75 |
| Concentrate in Ex.7 | 0.68 |
| Concentrate in Comp. Ex.2 | 0.98 |
| Commercial Additive | 1.18 |

The detergent of the present invention has an excellent intake valve detergency.

Test 3

The Intake Valve Deposits and Combustion Chamber Deposits Test of Gasoline Engine The intake valve deposit and combustion chamber deposit test of the gasoline engine were conducted with the gasoline fuel comprising 400 ppm by weight of the concentrate of the detergent in Example 7 and comparative Example 2 respectively and the fuel containing no detergent. The engine used is a HYUN-DAI MOTORS ELANTRA engine 1.6 l DOHC, the particulars of which are as follows.

| Type of Engine | 4 cylindered DOHC | Maximum Output | 126/6000(PS/rpm) |
|---|---|---|---|
| Bore × Stroke | 82.3 × 75 mm | Maximum Torque | 15.3/5000(kg/rpm) |
| Displacement Volume | 1.596 cc | Way of Fuel Supply | MPI |
| Compression Ratio | 9.2 | Maximum Speed/hr | 180 km/hr |

The mode of the test used is Benz M102E and the conditions of the test are as follows.

| Test Hour | 60 hours | Torque | 3.1 ~ 3.7 Nm |
|---|---|---|---|
| Oil Temperature | 90 ~ 105° C. | Inlet Temperature | 25 ~ 35° C. |
| Cooling water Temperature | 85 ~ 95° C. | rpm | 800 ~ 3,000 |

The test was conducted for 60 hours, at the end of which time the intake valve is removed, washed with n-hexane and weighed. The previously determined weight of the clean valve is subtracted from the weight of the valve at the end of the run. The difference between the two weights is the weight of the deposit formed for the test. The operating conditions of the test are as follows. The amount of deposit formed on the intake valve in shown in following table.

| Additive (400 ppm by wt.) | Deposits on intake valve(mg/valve) | Deposits in the combustion chamber (mg/cylinder) |
| --- | --- | --- |
| Fuel without additive | 137.6 | 560.3 |
| Concentrate of Ex 7 | 4.5 | 675.7 |
| Concentrate of Compar. Ex.2 | 5.6 | 747.2 |

When the detergent of the present invention (the concentrate of Example 7) was introduced to the gasoline fuel, deposits formed on the intake valve were decreased as compared with the fuel without the additive and the gasoline containing the concentrate of Comparative Example 2.

Deposits formed in the combustion chamber were decreased in comparison with the gasoline containing the concentrate of Comparative Example 2. Accordingly, it is shown that the detergent of the present invention has an excellent detergency for the intake valve and combustion chamber of the gasoline engine. Thus, it is recognized that the detergent of the present invention has an excellent detergency when added to the gasoline fuel and the diesel fuel.

What is claimed is:

1. Multihydroxypolyalkenyl-substituted amine compounds having the following formula (I)

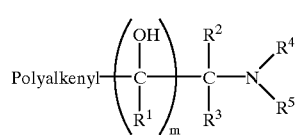

(I)

wherein polyalkenyl denotes a branched alkyl derived from polyolefin which has a molecular weight of 400~5,000 and is prepared with olefin having 2 to 6 carbon atoms; m is an integer ranging from 2 to 10, $R^1$, $R^2$ and $R^3$ may be identical or different, and represent a hydrogen atom or a linear or branched alkyl having 1 to 4 carbon atoms: $R^4$ and $R^5$ may be identical or different, and denote a hydrogen atom, a $C_1$–$C_{10}$ alkyl group, a hydroxyalkyl, a phenyl, naphthyl, an aminoalkyl of formula (II) or a polyaminoalkylene of formula (III), $$—R^6—N\begin{matrix}R^7\\R^8\end{matrix}$$ (II)

wherein $R^6$ denotes a $C_2$–$C_{10}$ alkylene group: $R^7$ and $R^8$ may be identical or different, and denote a hydrogen atom, a $C_1$–$C_{10}$ alkyl group, a phenyl, a naphthyl or a $C_1$–$C_{10}$ hydroxyalkyl group, $$-\left(R^6—N\begin{matrix}R^7\\ \end{matrix}\right)_n R^8$$ (III)

wherein n is an integer ranging from 2 to 8, $R^6$, $R^7$ and $R^8$ are the same as defined above.

2. Multihydroxypolyalkenyl-substituted amine compounds according to claim 1, wherein the polyolefin has a number-average molecular weight of 500~2,500 and is produced from olefins having 3 to 4 carbon atoms.

3. Multihydroxypolyalkenyl-substituted amine compounds according to claim 2, wherein the polyolefin is polybutene.

4. Multihydroxypolyalkenyl-substituted amine compounds according to claim 3, wherein $R^4$ denotes a hydrogen atom or an aminoethyl, and $R^5$ represents an aminoethyl, a hydroxyethyl or an aminoethyleneaminoethyl, and m is 2.

5. Multihydroxypolyalkenyl-substituted amine compounds according to claim 4 wherein $R^4$ denotes a hydrogen atom and $R^5$ represents an aminoethyleneaminoethyl.

6. Multihydroxypolyalkenyl-substituted amine compounds according to claim 4 wherein both of $R^4$ and $R^5$ are aminoethyl groups.

7. A process for preparing multihydroxypolyalkenyl-substituted amine compounds of formula (I) which comprises the step of reacting a hydroxypolyolefin epoxide of formula (IV) with an amine of formula (V):

$$\text{Polyalkenyl}\left(\begin{matrix}OH\\|\\C\\|\\R^1\end{matrix}\right)_m \begin{matrix}R^2\\|\\C—N\\|\\R^3\end{matrix}\begin{matrix}R^4\\ \\R^5\end{matrix}$$ (I)

$$\text{Polyalkenyl}\left(\begin{matrix}OH\\|\\C\\|\\R^1\end{matrix}\right)_{m-1}\begin{matrix}\\C\\|\\R^1\end{matrix}\begin{matrix}O\\ \diagup\diagdown\\C—R^2\\|\\R^3\end{matrix}$$ (IV)

$$HN\begin{matrix}R^4\\R^5\end{matrix}$$ (V)

wherein polyalkenyl denotes a branched alkyl derived from polyolefin which has a molecular weight of 400~5,000 and is prepared with olefin having 2 to 6 carbon atoms: m is an integer ranging from 2 to 10: $R^1$, $R^2$ and $R^3$ may be identical or different, and represent a hydrogen atom or a linear or branched alkyl having 1 to 4 carbon atoms: $R^4$ and $R^5$ may be identical or different, and denote a hydrogen atom, a $C_1$–$C_{10}$ alkyl, a hydroxyalkyl, a phenyl, a naphthyl, an aminoalkyl of formula (II) or a polyaminoalkylene of formula (III), $$—R^6—N\begin{matrix}R^7\\R^8\end{matrix}$$ (II)

wherein $R^6$ denotes a $C_2$–$C_{10}$ alkylene, $R^7$ and $R^8$ may be identical or different, and denote a hydrogen atom, a $C_1$–$C_{10}$ alkyl, a phenyl, a naphthyl or a $C_1$–$C_{10}$ hydroxyalkyl,

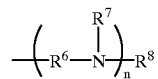 (III)

wherein n is an integer ranging from 2 to 8, and $R^6$, $R^7$ and $R^8$ are the same as defined above.

8. A fuel concentrate containing an inert stable oleophillic organic solvent and 10–70% by weight of the multihydroxypolyalkenyl-substituted amine compounds of claim 1.

9. The fuel concentrate according to claim 8, wherein said multihydroxypolyalkenyl-substituted amine compounds is contained in the amount of 30–60% by weight.

10. The fuel concentrate according to claim 8, wherein the inert stable oleophillic organic solvent is an aliphatic or aromatic hydrocarbon solvent having a boiling point of 65–205° C.

11. A fuel composition comprising a major amount of hydrocarbon fuel and an effective detergent amount of multihydroxypolyalkenyl-substituted amine compounds of claim 1.

12. The fuel composition according to claim 11, wherein the hydrocarbon fuel is hydrocarbons boiling in the gasoline or diesel range and the multihydroxypolyalkenyl-substituted amine compounds are contained in the amount of 50–5,000 weight ppm.

* * * * *